July 31, 1923.

F. G. WALKER 1,463,346

FOLDABLE CLOSURE

Filed April 14, 1919

Inventor
Frederick G. Walker
By Brown Boettcher & Dienner
Atty's

July 31, 1923.

F. G. WALKER

FOLDABLE CLOSURE

Filed April 14, 1919

Inventor:
Frederick G. Walker
By Brown Boettcher+Dienner
Atty's

July 31, 1923.

F. G. WALKER

FOLDABLE CLOSURE

Filed April 14, 1919

Inventor:
Frederick G. Walker
By Brown, Boettcher & Dienner
Atty's

Patented July 31, 1923.

1,463,346

UNITED STATES PATENT OFFICE.

FREDERICK G. WALKER, OF CHICAGO, ILLINOIS.

FOLDABLE CLOSURE.

Application filed April 14, 1919. Serial No. 289,839.

*To all whom it may concern:*

Be it known that I, FREDERICK G. WALKER, a citizen of the United States, residing at Chicago, in the county of Cook and State of Illinois, have invented a certain new and useful Improvement in Foldable Closures, of which the following is a full, clear, concise, and exact description, reference being had to the accompanying drawings, forming a part of this specification.

My invention relates to improvements in buildings, and has special reference to means for effecting the opening and closing of openings in the walls of buildings, such as door and window openings and openings effecting communication with auditoriums, churches, halls, club-rooms, etc.

The object of my invention is to provide a foldable closure for such an opening, which shall be capable of being easily manipulated, viz, opened and closed; which shall be capable of being built of any desired width; the several leaves or parts of which shall be retained in true vertical position; and which can be built and installed at a relatively low cost.

A further object of my invention is to provide a bellows or accordion style of closure which shall have leaves or parts of uniform width, the alternate hinged edges whereof shall be supported and guided in opening and closing by suitable movable posts; and which can be arranged to provide weather tight closures at the bottom, top and sides of the opening, if desired.

A further object of my invention is to provide a wide door for garages and the like which shall open outward but which shall be free of any guide rails, pulleys or other mechanisms which are exposed to the weather or arranged on the outside of the building.

Many inventors have attempted to solve the problem of providing a closure for a relatively wide opening and many structures have been produced, but each form carries with it some detrimental features, such as a half width leaf at the wall end of the series, or the impossibility of providing a weatherproof closure or seal at the bottom and the top of the opening, or the necessity of providing tracks and pulleys or other apparatus more or less exposed to the weather.

By means of my invention I am not only enabled to eliminate all of the above detrimental features, but I am also enabled to produce a closure for any desired width of opening which can be folded to occupy a minimum of space, when open, and which can be built at a relatively low cost.

For a clear understanding of my invention, attention is directed to said drawings, in which:

Figure 1 is a fragmentary inside elevation of a closure embodying my invention in one form and particularly adapted for garage doors and the like;

Figure 18 is a view similar to Figure 4 showing an enlarged inner elevation of the structure employed in the form shown in Figure 16;

Figure 19 is a fragmentary vertical sectional view on the line 19—19 of Figure 18;

Figure 20 is a horizontal sectional view on the line 20—20 of Figure 19;

Figure 21 is a fragmentary isometric view of the upper end of the post shown in Figure 18, with the guide shoe attached;

Figure 22 is an enlarged fragmentary horizontal section of the post and sash, similar to Figure 20;

Figure 23 is a fragmentary vertical section similar to the lower part of Figure 19, and showing a slightly modified structure;

Figure 24 is a fragmentary elevational section similar to the lower part of Figure 18 and showing a slightly modified form; and, Figure 25 is a fragmentary vertical section on the line 25—25 of Figure 24.

As indicated by the number of different embodiments of my invention shown in the drawings, my invention is capable of being arranged to meet or fulfill practically any conditions which may arise.

Figure 1:
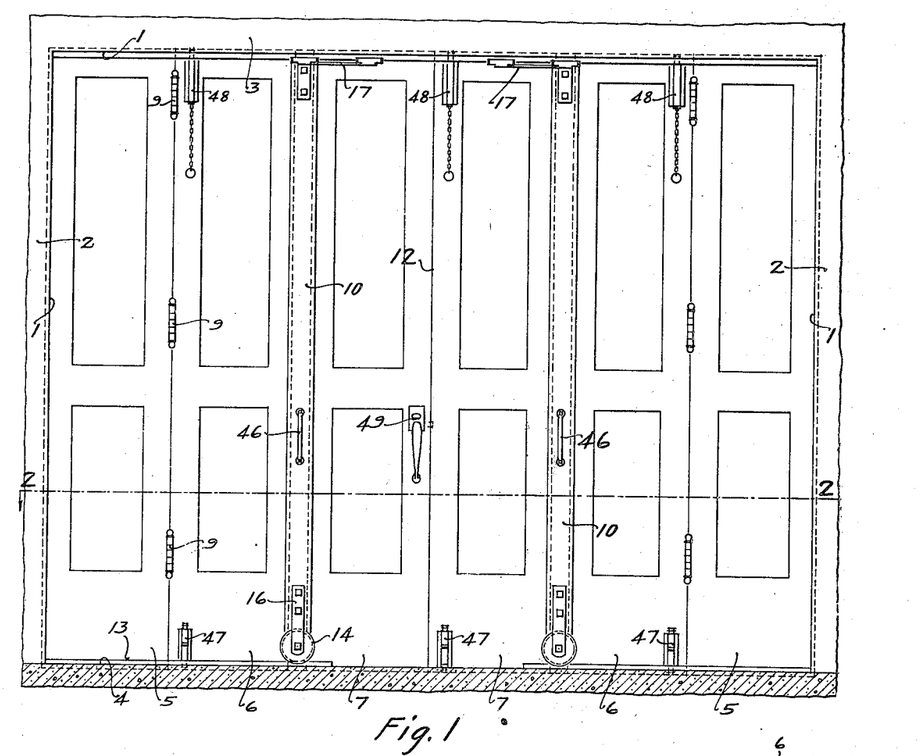
Figure 2:
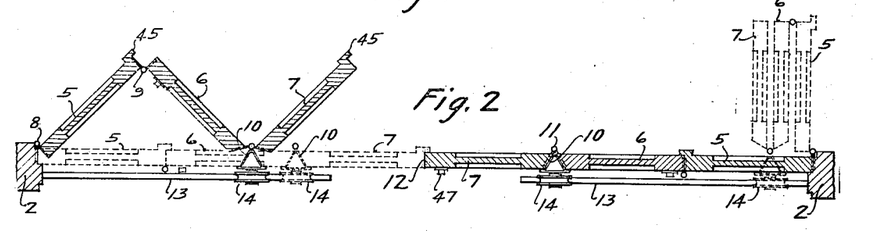
Figure 2 is a horizontal section on the line 2—2 of Figure 1; one half of the closure shown partly open.
Figures 14, 15:
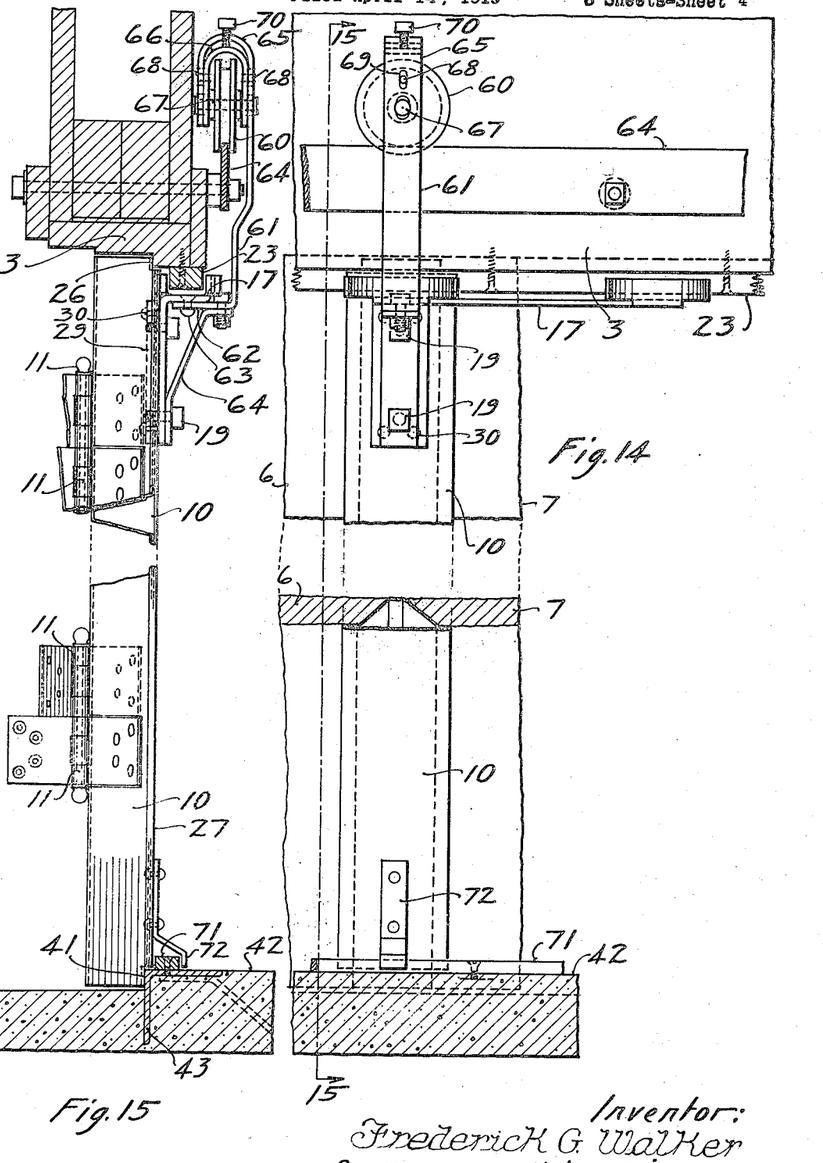
Figure 14 is a fragmentary inside elevation similar to Figure 4; and showing a trolley supported door adapted to swing outwardly.
Figure 15 is a fragmentary vertical section on the line 15—15 of Figure 14, the doors not being shown.

Possibly the principal application is in providing doors for garages and the like, the doors arranged to swing outwardly and adapted to make weather tight joints at the bottom, top and sides of the doors. This form may include roller supports at the lower ends of the posts as shown in Figures 1 and 2 or a trolley support at the top as shown in Figures 14 and 15; these forms both provide for the swinging of the doors outwardly.

Figures 11, 12:
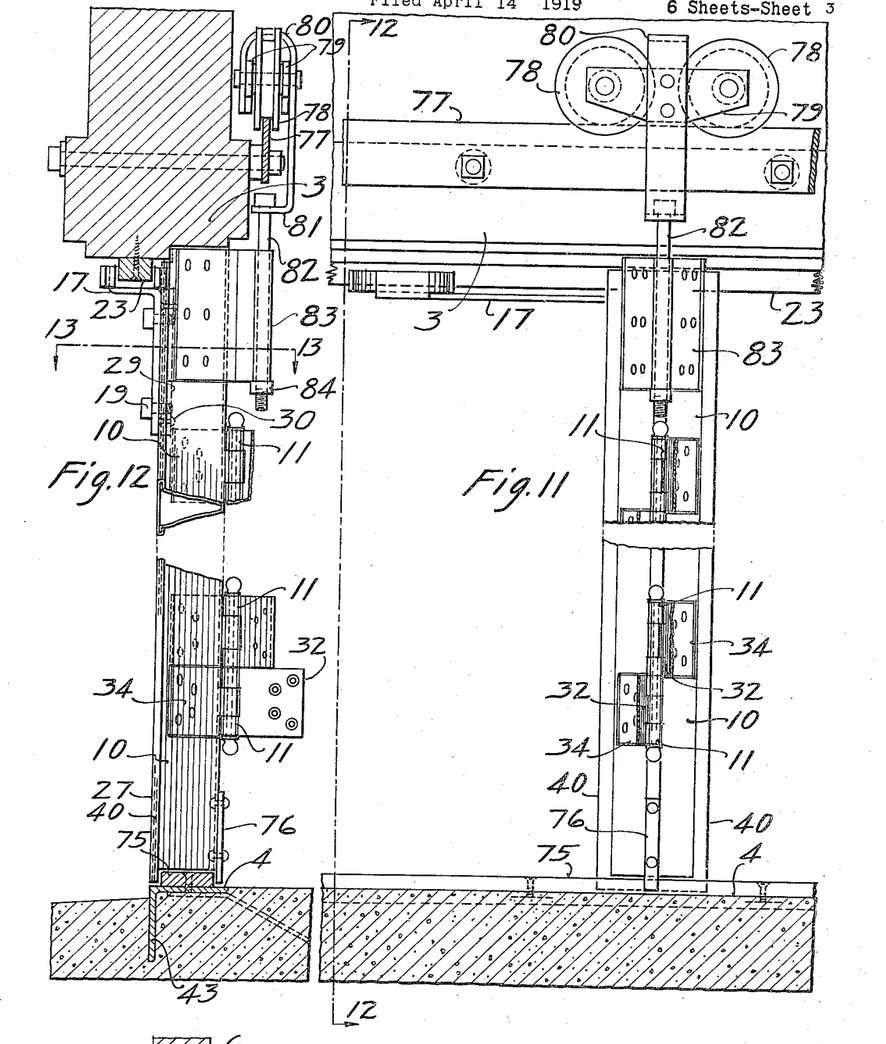
Figure 11 is a view similar to Figure 4 showing a trolley supported door adapted to swing inwardly.
Figure 12 is a fragmentary vertical section on the line 12—12 of Figure 11.
Figure 13:
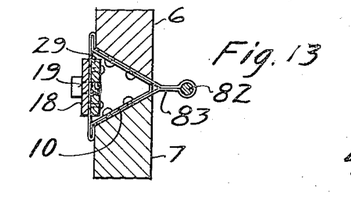
Figure 13 is a detail horizontal section on the line 13—13 of Figure 12.

Under other requirements it may be necessary to swing the doors inwardly, and I have illustrated this form in Figures 11 and 12.

Figure 16:
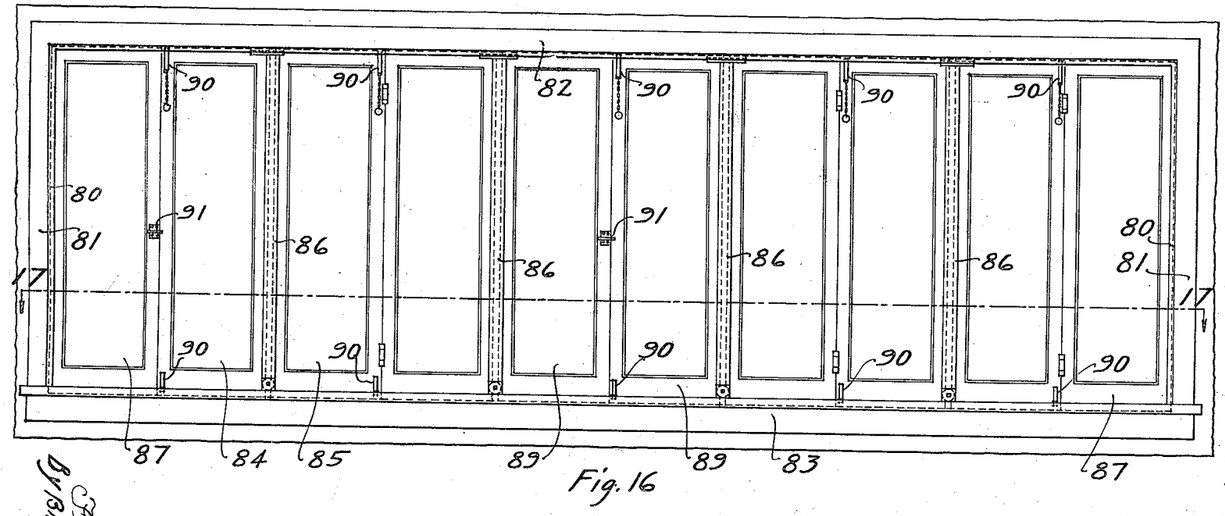
Figure 16 is a fragmentary inner elevational view similar to Figure 1, but showing my invention embodied in a casement window.
Figure 17:
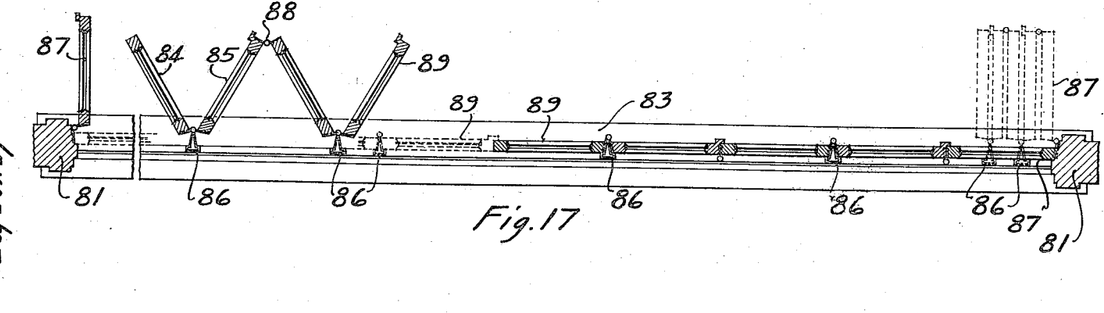
Figure 17 is a fragmentary horizontal sectional view substantially on the line 17—17 of Figure 16.

There is a demand for wide opening closures for use in connection with churches, schools, hotels and the like, and in Figures 16 and 17 I have illustrated my invention embodied in the form of a very wide casement window, capable of being opened at a number of different points and of providing various sized openings up to substantially the full width of the main opening.

Figures 18, 19, 20, 21, 22, 23, 24, 25:
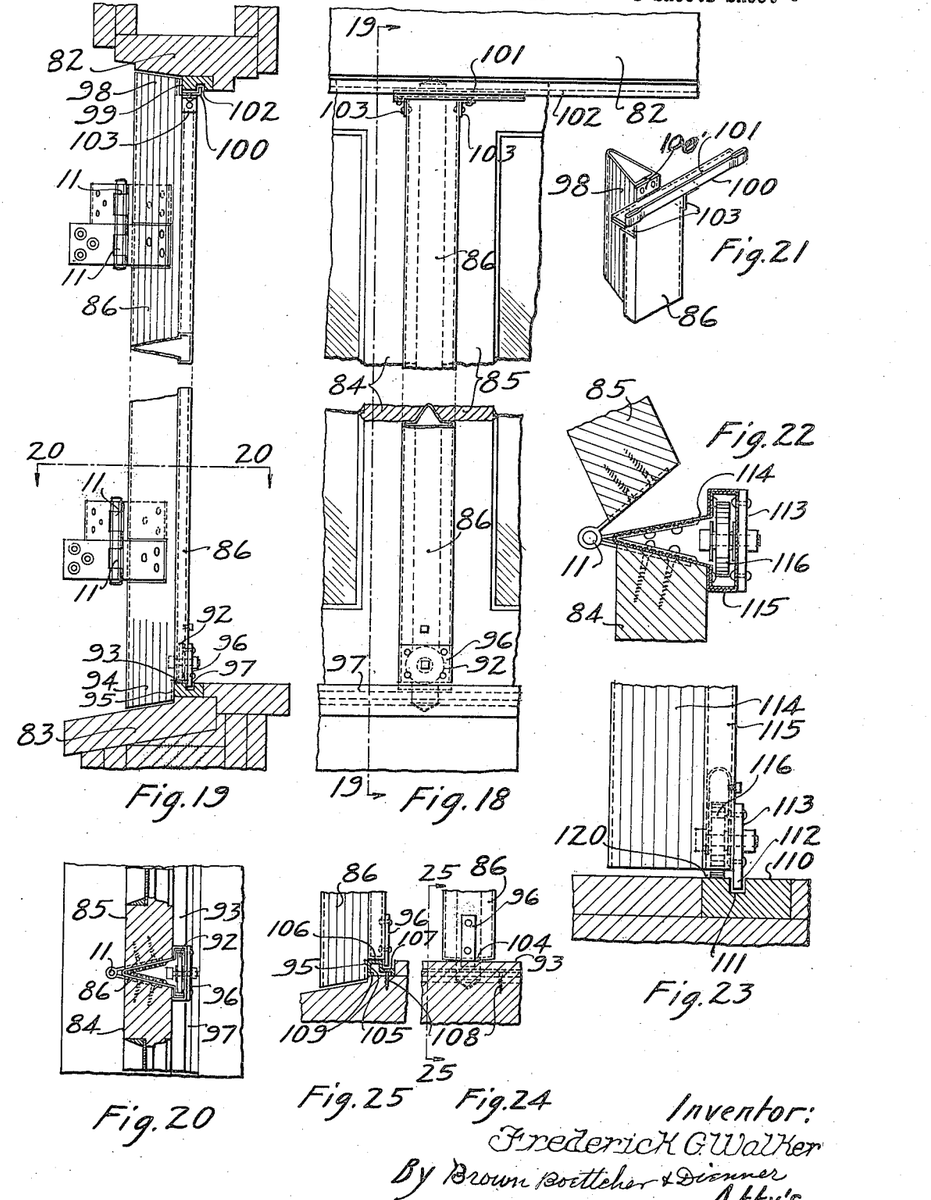

My invention is also capable of embodiment in the form of a folding partition for use in a building between rooms, and in Figures 22 and 23 I have shown an adaptation for this purpose.

I will explain the various forms in detail in the order above mentioned.

Referring now particularly to Figures 1 to 10 inclusive:—

1 represents a relatively wide opening or doorway to be closed, having jambs 2, a lintel 3 and a lower edge or sill 4.

The openings to which I apply my invention are preferably as shown relatively wide openings which if closed by two separately hinged leaves, the leaves would be wider than convenient or practical to use.

I provide a plurality of relatively narrow door leaves 5, 6 and 7 as shown in Figures 1 and 2, each long enough to extend from the bottom to the top of the opening to be closed and hinged together at their meeting edges, so that when in closed position their combined width is sufficient to close half of the doorway, and I provide a similar set of leaves for closing the other half of the doorway.

The leaf 5 is hung at one edge by suitable hinges 8 to the adjacent side jamb 2, and at its opposite edge is hingedly connected to the adjacent edge of the leaf 6 by suitable hinges 9 arranged at the inner side of the door so that these edges can swing freely outward. At or between the meeting edges of the leaves 6 and 7 is arranged a movable post 10 to which I hinge both leaves 6 and 7 by suitable hinges 11. I prefer, as shown in Figures 1 to 6, to make this post of sheet metal, but obviously, as shown in Figure 7, it may also be made of wood.

Figure 3:
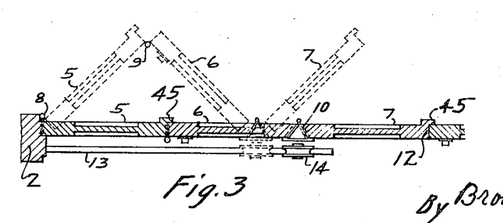
Figure 3 is a fragmentary section similar to Figure 2 showing one portion partly opened, in dotted lines.
Figures 4, 5, 6, 7, 8, 9, 10:
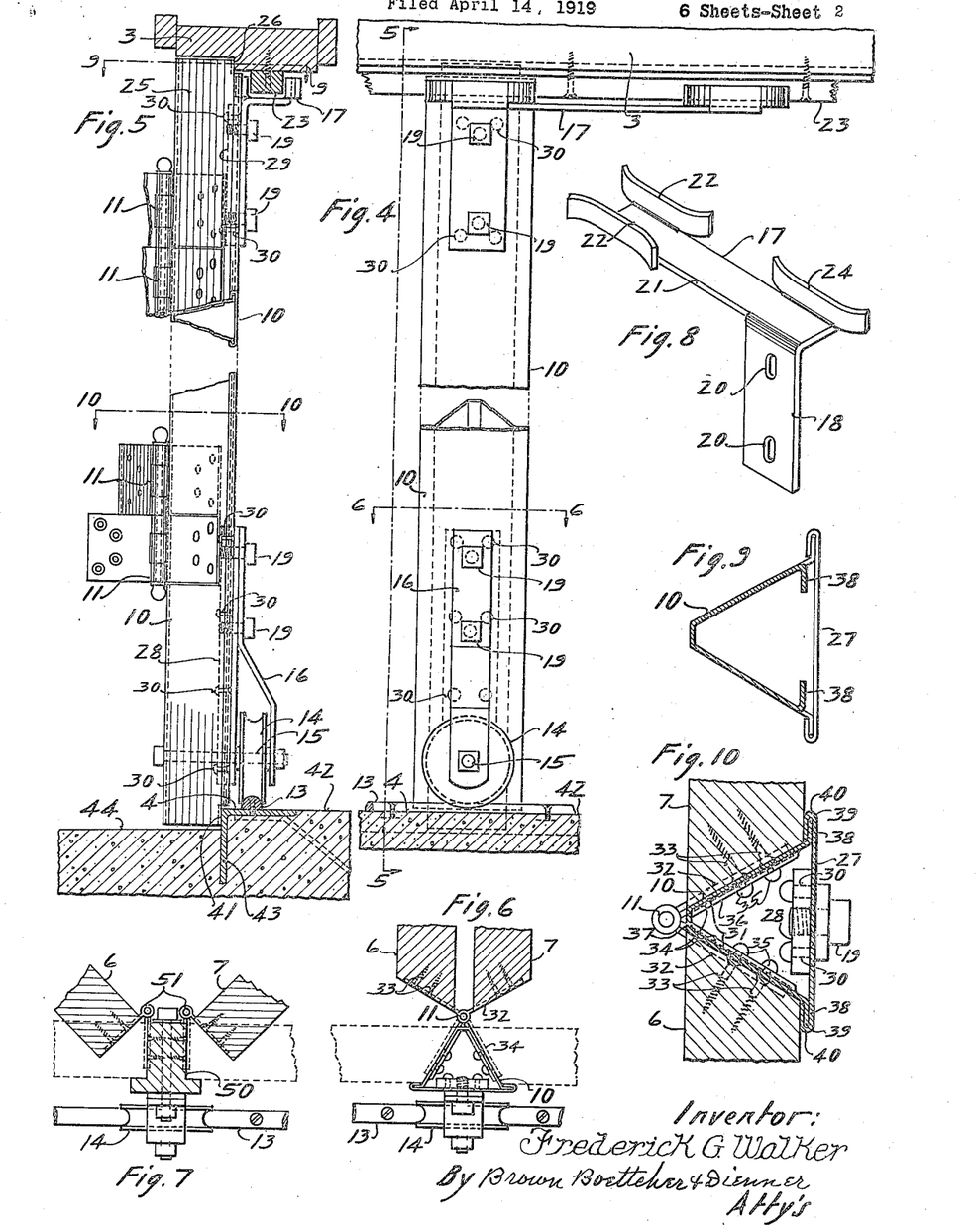
Figure 4 is a fragmentary inner elevation of the supporting structure, the doors being removed.
Figure 5 is a fragmentary vertical section substantially on the line 5—5 of Figure 4.
Figure 6 is a fragmentary horizontal section on the line 6—6 of Figure 4, the doors being in place and opened.
Figure 7 is a view similar to Figure 6 showing a modified form of post.
Figure 8 is a detail isometric view of the upper guide shoe.
Figure 9 is an enlarged detail horizontal section of the post on the line 9—9 of Figure 5.
Figure 10 is a fragmentary detail horizontal section of the post and doors on the line 10—10 of Figure 5.

The opposite edge 12 of the leaf 7 meets a similar free edge of the leaf 7 of the opposite half of the closure as shown in Figures 1, 2 and 3 and completes the closing of the opening, 1.

The problem presented in this particular form of closure is to provide a weather tight closing of the door at the top and the bottom of the opening and provided with supporting parts which are not exposed to the weather.

The post 10 and the hinged connection of the leaf part 5 to the jamb 2 are the means which I employ to support the door and permit the several leaves to be opened as indicated in Figures 2 and 3, and to be folded clear back to one side as shown in dotted lines in Figure 2.

The post 10 is the guiding and controlling element in the opening and closing of the leaves 5, 6, and 7, and I arrange it to slide freely from its closed position as shown in Figure 1, to its open position, as shown at the right hand of Figure 2 in dotted lines. For permitting the post to move easily and for guiding it at its lower end, I provide a rail or track 13 on the floor and parallel with the plane of the opening to be closed, and I provide a grooved supporting wheel 14 arranged to roll on this track and mounted on a suitable bearing pin 15, which is carried by a strap 16 and the lower end of the post 10, so that as the doors are opened and closed the post will roll easily along parallel with the door opening.

To prevent the post 10 swinging out of its true position with the plane of the wheel 14 parallel with the door opening, I provide a guide bracket or shoe 17 for the upper end of the post. I preferably extend the guide shoe 17 toward the inside of the opening, so that it will not interfere with the full opening of the door. This guide shoe comprises an angle member having a vertically depending part 18 adapted to be bolted to the back of the post 10 by bolts 19 and provided with vertically elongated holes 20 for receiving said bolts so as to permit the shoe to be adjusted vertically to properly engage its guide. As shown in Figure 4 the horizontal part 21 of the shoe extends to the right, and I form it with upwardly extending side flanges 22 at its free end, which are arranged to embrace a guide rail 23 secured to the lintel 3 parallel with the door opening. I provide a third vertically extending flange 24 on the shoe 17 at its base end which contacts with the rear face of the rail 23 and holds the post from tipping outwardly. As shown, I form the ends of the several guide flanges flared outwardly so as to present smooth bearing surfaces to the guide rail 23.

To hold the post 10 against tipping inwardly I extend its upper end 25 to the top of the door opening and arrange it to overlap the closing ledge 26 which I provide at the top of the opening and against which the upper ends of the several leaves 5, 6 and 7 close tightly. The post 10 is thus held against tipping out or in. It is held against twisting or shifting out of the true parallel relation to the door opening by the guide shoe and it is held in true vertical position in a plane parallel with the door opening by the hinging of the two leaves 5 and 6 together and to the jamb 2 and to the movable post 10.

As best shown in Figures 9 and 10 I preferably make the post 10 triangular in horizontal cross section and form it up out of sheet metal. This construction makes a very light and rigid post and one to which the various fittings can be readily and conveniently attached. One flat side 27 of the triangular post is arranged at the back and provides a flat face to which the wheel bracket 16 at the bottom and the guide shoe 17 at the top can be bolted.

For convenience in bolting these members to the post I provide inner reinforcement plates or bars 28 and 29 at the bottom and top of the post respectively, secured against the rear wall of the post by rivets 30 and provided with threaded holes for receiving tap bolts 19 for securing said attachments. By means of this construction I am enabled to ship the posts in knocked-down condition and assemble them with the brackets before they are installed. The post is substantially equi-lateral triangular in cross section and the two inclined sides 31 of the post extend at equal angles to the base. The edge of the leaf 6 which is hinged to the post closes against one of these inclined sides, and the adjacent edge of the leaf 7 closes against the opposite inclined side, these edges of the leaves being correspondingly inclined so as to form tight closures.

The hinges 11 have one leaf 32 in each case secured to the edge of the door leaf which it supports by screws 33 and the opposite leaf 34 secured to the adjacent wall of the post 10 by rivets 35. I preferably depress or form the walls 31 inwardly as at 36 to make room for the leaves 34 of the hinges 11 upon the outer surface of the post and flush with same, so that the hinges will not interfere with a proper closing of the doors, the opposite leaves 32 of the hinges being sunk into the back edges of the doors flush with same.

I preferably form the two walls 31 of the post 10 of a single piece or strip of sheet metal bent along a medial line to form the narrow front edge 37, and provided at their rear edges with outwardly turned longitudinal flanges 38. I form the rear wall 27 of a separate strip and bend its lateral edges 39 around to embrace and enclose the flanges 38, thus forming laterally extending longitudinal closure flanges 40 on the post against which the leaves 6 and 7 can tightly close, when in closed position as best shown in Figure 10.

To permit the leaves to close tightly at the top against the ledge 26 I cut away the back plate 27 just short of the ledge 26, as best shown in Figure 5, and I turn the flanges 38 inwardly at this point, as best shown in Figure 9, to form a suitable bearing surface on the post for contact with the ledge 26. At the bottom, to provide a weather proof closure for the door, I provide a sill ledge 41, which, in the form shown in Figure 5 drops down slightly below the inside floor level 42, and I may provide this by means of an angle bar 43 anchored into the cement of which the floor 42 and the entranceway 44 is made. In any event, the ledge 41 defines the face of the opening to be closed and in like manner to the construction at the top of the post I cut away the back plate 27 and form the flanges 38 inwardly. The rail or track 13 is secured directly to the floor and in the form shown to the upper or floor face of the angle bar 43, which forms an excellent foundation upon which to secure this rail. As shown in Figures 1 and 2 I provide two of the rails 13, one for each half of the door, and each projecting toward the middle of the door opening far enough to carry the wheel 14 to its closing position. As best shown in Figures 2 and 3, I form the several leaves with suitable overlapping closure strips 45 at their meeting edges so that when the doors are closed the several joints between the leaves will be substantially weather proof. For convenience in manipulating the doors I provide a handle 46 on each post 10, at a suitable height, and by means of which the posts can be pulled along and the doors folded or opened. To hold the doors closed, I provide suitable bolts 47 at the bottom, and similar bolts 48 at the top of the several sections, and I provide the middle leaf 7 which has the overlapping strip 45 with a suitable lock for engagement with the opposite leaf 7. This opposite leaf is the one at the middle of the opening which carries the bolts 47 and 48.

As best shown in Figure 7, I do not necessarily make the posts 10 of sheet metal. In this instance I have shown a solid wooden post 50, T-shaped in cross-section instead of triangular, and having the leaves 6 and 7 hinged to its flat sides by hinges 51. As will be clear from Figures 6 and 7, when special hinges are not used, the leaves hung on the triangular posts can fold closer together than those mounted on the wooden or T-shaped posts, but under certain conditions the wooden post structure can be made cheaper than the metal structure, otherwise the two posts fulfill the same functions.

In Figures 14 and 15 I have illustrated a form of my invention, in which the sections or leaves similar to the form shown in Figures 1 and 2, swing or fold to the outside so as to make a tight closure against the angle bar sill 41 at the bottom, and against the closure ledge 26 at the top similar to the manner of swinging the sections in the forms illustrated in Figures 1 and 2. In this form, however, instead of carrying the weight of the post 10 and the sections hinged thereto upon a wheel rolling on the floor, I carry the weight upon the wheel 60 which I attach to the upper end of the post 10. For this purpose I provide a hooked hanger strap 61, its lower end 62 formed to project around underneath the guide shoe 17, and to be secured to the horizontal part thereof by a rivet 63, and I provide an angle brace 64 secured at its upper end to the lower end 62 of the strap 61, and its lower end secured to the post 10 by one of the bolts 19 which secured the guide shoe. I provide a horizontal supporting rail 64 bolted to the inner face of the wall of the building above the opening 1 and I form the strap 61 with hooked upper end 65 and projecting above the rail 64 to properly receive the wheel 60 between the two sides of the upper end. I make the U-shaped or hooked upper end of the strap 61 wide enough to embrace a U-shaped support member 66, in the lower end of which I mount the wheel 60 on a suitable bearing pin 67, the pin also projects through slots in the arms of the hanger 61. To hold the member 66 in proper upright position within the hooked end of the hanger 61 I provide a guide pin 68 on the member 66 which enters a vertical slot 69 in the strap 61. For setting the wheel 60 in relation to the strap hanger 61 to hold the post 10 and in consequence the door at the proper height, I provide a set screw 70, threaded through a suitable hole in the top of the strap hanger, and adapted to contact with the upper end of the member 66. The wheel 60 is grooved and the track 64 fits within the groove so as to properly retain the wheel on the track.

I hold and guide the upper end of the post 10 in this instance in the manner already described, in relation to the form shown in Figures 1 and 2. To retain the lower end against swinging out or in, I arrange the lower end of the post to contact with the sill, as heretofore described, and I arrange a guide member 71, close to the edge of the door opening on the floor 42, and preferably secured on top of the angle bar 43, and I provide a depending guide clip 72 secured to the lower rear face of the lower end of the post, and formed to engage the rear edge of the guide member 71. In this instance the post hangs freely from the pulley 60 at the top and the lower end is held from swinging in by contact with the ledge 41, and with the guide member 71, and it is held against swinging out by the engagement of the clip 72 with the rear edge of the guide member 71.

In Figures 11 and 12 I have illustrated a form of door adapted to swing inwardly. In this form as shown I have reversed the positions of the posts 10, turning their narrow edges inwardly instead of outwardly, and I provide a raised sill 75 extending directly beneath the closed doors, and I retain the posts 10 above same by extending the back plate 27 and the edge flanges 40 down to overlap the front edge of the sill, and I provide a clip 76 riveted to the rear or narrow edge of the post 10 and extending down to engage the rear edge of the sill. This sill is equal in width with the thickness of the door. To support the weight of the post and sections hinged thereto, I provide a rail track 77 similar to the track 64 and secured to the inner face of the wall above the door opening. I preferably provide a trolley having two wheels 78 connected by side straps 79 to ride on the track. I secure a U-shaped hanger 80 to the side straps 79 between the two wheels and bent inwardly at its lower end 81 to hang beneath the track 77. In this lower end I hang a pivot bolt or pin 82 and connect this hanger pivot or rod to the post 10, by means of a hanger plate 83 bent along its middle portion around the rod 82 and having its side edges riveted to the inclined sides of the upper end of the post. In like manner to the securing of the hinges 11 to the metal parts 10, I depress the side walls of the post to provide space for receiving the connecting sides of the hanger plate 83 so that the adjacent edges of the doors will not need to be cut out for this purpose. The rod 82 extends down thru the eye thus formed, and I thread its lower end for a nut 84, by means of which I can readily adjust the hanging mechanism to support the weight and allow the doors to open and close freely. In this instance, I hold the post against twisting around by means of the guide shoe 17 and the guide rail 23 similar to the form already described.

In Figures 16 to 20 inclusive I have illustrated a form of my invention especially adapted for use as a casement or folding casement window. In this form the stresses are not so severe as in the forms already described, and consequently I can make the structure much lighter. In these figures I have also illustrated the possibility of extending the opening and the hinged closures substantially indefinitely. In other words, as here illustrated, it will be clear that I am not limited to three leaves or sections, but that I can hinge as many sections as I desire together to properly fill a very wide opening. Furthermore, it should also be clear that while the showing made in Figures 1 and 2 is typical of certain installations, that I am not limited to the idea of folding one half of the closure to one side and the other half to the other side of the opening, for it might be convenient under certain conditions to fold the whole closure to one side or to arrange the closure so that I am enabled to open a relatively narrow opening at one side and to open a larger opening toward the other side.

In Figures 16 to 20 inclusive I have shown a very wide opening 80 defined by side posts 81, a top member or lintel 82 and a sill member 83. For closing this very wide opening I have provided a series of pairs of leaves, 84 and 85. One edge of each leaf is hinged to one of my movable posts 86, which is similar to the post 10 already described, but may be made of wood overlaid by very thin sheet metal of wood alone or of hollow metal, as shown in Figure 17. These several pairs of leaves carried by the posts 86 occupy the middle portion of the opening and I preferably provide a single leaf 87 hinged to each side post and adapted to be opened independently of the other leaves to afford a narrow opening at each end of the series. I may, as indicated in Figure 17, hinge two or more of the pairs of leaves together, as shown at 88, so that the posts with their connecting leaves, will support each other and permit the convenient and easy folding of several sections to bellows form, as shown in dotted lines in Figure 17. The middle leaves 89 similar to the end leaves 87 can be opened independently to afford a relatively narrow opening at the middle of the series as well as at the ends.

For retaining the several sections closed, I provide suitable bolts 90 at the upper and lower ends, and suitable latch devices 91, at the meeting edges of the middle sections 89 and at the free edges of the end section or sections 87.

As best shown in Figures 18 and 19, I provide an anti-friction roller or wheel 92 rotatably mounted within the lower part of the post 86 adapted to roll on the flat upper surface of the window sill 93, and adapted to support the weight and permit the several sections to move easily to open and close same. To hold the lower end of the post against swinging in and out, I extend the lower end 94 of the post below the top of the sill 93 and arrange it to contact against the sill ledge 95 with which the several window sections make weather tight joints. This contact holds the lower end of the post from swinging inwardly. To hold it against swinging out, and to guide it along the line of travel in contact with the ledge 95, I provide a guide clip or plate 96 secured to the rear face of the post 86 and adapted to project below the surface of the sill 93 into a slot 97 extending longitudinally of the sill and parallel with the ledge 95. To hold the upper end 98 of the post 86 against swinging in and out and to hold the post against twisting around, I arrange its upper end to contact against the closing ledge 99, Figure 19, and against which ledge the several sections close tightly. I also provide a guide shoe 100 somewhat similar to the guide shoe 17, in that it is secured rigidly to the back of the post at its upper end, and obviously may project to one side or the other or be arranged centrally. In either case its length is determined by the thickness of the leaves hinged to the posts, and I arrange the extending ends of the guide shoes so that adjacent shoes will not interfere with each other, and thus prevent the complete opening of the windows, especially when my invention is applied to a casement window or folding partition. The guide 100 comprises a sheet metal member rigidly secured upon the upper end of the rear portion of the post, as best shown in Figure 21, and provided with an upturned longitudinal flange 101 along its rear edge which is adapted to enter a longitudinal groove or slot 102 which I provide in the top of the window frame and extending parallel with the window opening. To secure the guide member to the post I preferably provide angle brackets 103 secured to the under side of the member and to the side edges of the rear part of the post, as best shown in Figures 18 and 21, and I provide the guide 100 with an upturned flange 100' at its forward edge adapted to be secured to the post by rivets, as best shown in Figure 21.

In the application of my invention to some light weight casement windows, it is not necessary to provide the anti-friction rollers 92; indeed in some situations it is desirable to provide some obstruction or friction to the free movement of the posts 86, so that the several sections will remain in any opened or partly opened position, without other fasteners. For this purpose, I eliminate the roller 92, and provide a slightly rounded substantially flat bearing shoe or lower end 104 on the post 86 adapted to slide along on the sill 93, as best shown in Figures 24 and 25. In this instance I hold the lower end of the post against swinging in or out by the contact of the post against the closing ledge 95 and by the guides 96, as described in relation to Figure 19. In this present form I preferably provide a sheet metal construction of sill, as best shown in Figure 25. This construction comprises a sheet metal bar 105 formed to provide an upper flat surface 106 on which the shoe 104 slides and formed down at its rear edge to provide a groove 107, in which the guide clip 96 engages. I preferably retain this guide bar 105 in place by screws 108, which project through the bottom of the groove 107 and hence do not interfere with the sliding of the shoe 104. I preferably bend the front edge 109 rearwardly to form a firm bearing for the front part of the bar where it rests upon the wooden sill beneath.

In some applications of my invention, as, for instance, in providing folding partitions for use between parts of auditoriums or other rooms, it is desirable that the floor be obstructed or mutilated to the least possible extent. It is obvious that the general construction of the structure illustrated in Figures 16 and 17 is applicable to this use, except the particular arrangement at the bottom.

As shown in Figures 22 and 23, I modify this bottom construction where I embody my invention in partitions and the like, by making the floor 110 without closing ledges, and preferably, though not necessarily, without a door sill or threshold, though obviously a door sill or threshold could be used. In this instance I provide a longitudinally extending guide groove 111 in the floor parallel with the door opening and adapted to receive the lower projecting end 112 of a guide clip 113 secured to the back of the post 114. For this construction, which is usually heavier than the casement window construction, I preferably use the hollow steel post shown in Figure 22, but may use the construction described in relation to Figure 1. I make the back part 115 of the post considerably thicker so as to provide space to receive and conceal the supporting wheel 116 at the bottom of the post, and arranged with its lower portion projecting below the lower end of the post for contact with the floor 120, and sufficient to permit the free swinging of the door sections over the floor, as best shown in Figure 23. It is so obvious that vertical adjustment for the several forms shown in Figures 18 to 23 inclusive, similar to the adjustments already described for supporting the sash and doors free to swing on their hinges, can be provided, that it is not thought necessary to further complicate the drawings with a showing of this adjustment.

The rigid non-rotatable guide posts which I provide enable me to provide closures which are easily operable, of any desired number of sections, and to make them swing either out or in, and in either case eliminates the necessity of providing tracks or supporting wheels upon the outer face of the wall of the building where they would be more or less exposed to the weather.

I claim:

1. In a door of the kind described, a closure consisting of a plurality of leaves, foldable together to open the door, posts laterally movable in substantially the plane of the opening to which alternate edges of pairs of leaves are hinged, a guide rail at the top of the opening, and a guide rigid with each post extending laterally beyond the post in one direction and having engagement with the rail at its free end to hold the post against rotation in both directions.

2. In a folding closure of the kind described, a plurality of leaves hinged together and adapted to fold in bellows form to uncover the opening, posts hinged to the leaves at alternate joints and extending from the top to the bottom of the opening, guides at the top and bottom of the opening for guiding the posts in such movement, an anti-friction element carried by each post for sustaining the weight, a guide member at the top of the opening and a guide shoe rigid with the post and extending laterally beyond the post in one direction into engagement with said member for holding the post against rotation in both directions.

3. In a folding closure of the kind described, a post adapted to have swinging leaves attached thereto, for opening and closing the opening, said post arranged in vertical position and movable laterally with respect to said opening for folding and unfolding said leaves, means holding said post against tipping and an arm rigid with and extending laterally therefrom in one direction for holding the post against rotation in both directions during such movement.

4. In a folding door closure of the kind described, a plurality of leaves hinged together and adapted to be folded together to uncover the opening, posts movable laterally of the opening and extending from the top to the bottom thereof, means engaging the top and bottom of each post for guiding same in such movement, a guide shoe secured to the upper end of the post and extending laterally to one side beyond the post and a guide rail at the top of the opening adapted to be engaged by the shoe to hold the post against rotation in both directions.

5. In a multiple leaf door closure of the kind described, a vertical post, guided to move substantially in the plane of the door, the post being of triangular cross section, the adjacent leaves hinged to the thin edge of the post and the thick edge of the post arranged substantially in the plane of the inner face of the closure as and for the purpose specified.

6. In a multiple leaf door closure of the kind described, a vertical post movable parallel with the door opening and to which leaves are hinged, the post adapted to lie substantially within the plane of the door and provided with a thin outer edge, and a thicker inner edge, the thin edge facilitating a close relation of the adjacent hinged edges of the leaves, as and for the purpose specified.

7. In a door of the kind described, posts movable longitudinally of the door opening, leaves hinged at one edge in pairs to the posts and hinged together at their other edges to open and close as the posts are moved, means at the bottom and a rail at the top of the opening for guiding the posts, and arms rigid with the upper ends of the posts extending in one direction laterally beyond the posts into engagement with the rail to hold the posts against rotation, and adapted as the door is opened to pass the next adjacent post so that the several posts with their arms can nest together.

In witness whereof, I hereunto subscribe my name this 12th day of April 1919.

FREDERICK G. WALKER.